United States Patent Office 3,037,027
Patented May 29, 1962

3,037,027
2,3-DIPHENYL-1,1,4-TRIOXO-1,2,3-THIADIAZOLIDINES
Raymond M. Dodson, Park Ridge, and Viktor Papesch, Morton Grove, Ill., assignors to G. D. Searle & Co., Chicago, Ill., a corporation of Delaware
No Drawing. Filed Nov. 9, 1959, Ser. No. 851,554
6 Claims. (Cl. 260—301)

The present invention is concerned with novel anti-inflammatory trisoxygenated thiadiazolidines and with a novel process for the manufacture of same. The compounds of this invention are more particularly designated as 2,3-diphenyl-1,1,4-trioxo-1,2,3-thiadiazolidines and derivatives thereof, and can be represented by the structural formulae

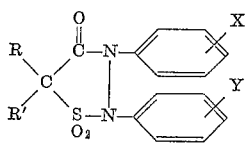

and

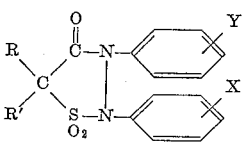

wherein R and R' are selected from the group consisting of hydrogen and lower alkyl radicals, and X and Y are hydrogen.

Other anti-inflammatory substances suitable for the purpose of this invention are those designated by the structural formulae supra wherein R is hydrogen, R' is selected from the group consisting of hydroxy (lower alkyl), aryl, arylthioalkyl, arylsulfinylalkyl, and arylsulfonylalkyl radicals; and X and Y are selected from the group consisting of hydrogen, halogens, nitro, lower alkoxy, lower alkanoyloxy, amino, and acylamino radicals.

The lower alkyl radicals represented by R and R' and encompassed also by the R term in lower alkoxy (—OR) and lower alkanoyloxy

are exemplified by methyl, ethyl, propyl, butyl, pentyl, hexyl, and the branched-chain isomers thereof.

The condensation of an α-chlorosulfonylalkanoic acid chloride represented by the structural formula

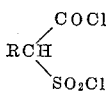

wherein R is selected from the group consisting of hydrogen, lower alkyl, and aryl radicals with an hydrazobenzene of the structural formula

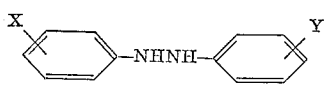

wherein X and Y are as defined supra, yields the 1,2,3-thiadiazolidines of this invention, as represented by the structural formulae

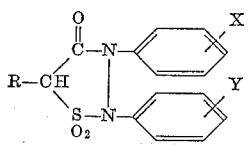

and

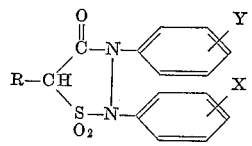

The requisite diacid chlorides are manufactured by treatment of the corresponding α-sulfoalkanoic acids with excess thionyl chloride. These α-sulfoalkanoic acids can be prepared from the appropriate α-bromoalkanoic acid by reaction with sodium sulfite, conversion to the barium salt, and acidification of the latter with sulfuric acid. As a specific example of this process, α-bromocaproic acid is converted to the potassium salt, which is treated with sodium sulfite to afford the alkali salt of α-sulfocaproic acid. The latter salt is treated with barium chloride to precipitate the barium salt, which is decomposed with sulfuric acid resulting in α-sulfocaproic acid. Reaction of this dibasic acid with excess thionyl chloride produces α-chlorosulfonylcaproyl chloride.

2,3-diphenyl-1,1,4-trioxo-1,2,3-thiadiazolidine, prepared by the condensation of α-chlorosulfonylacetyl chloride with hydrazobenzene according to the process described supra, can be converted to the 5,5-dialkyl compounds of this invention by treatment with at least two molecular equivalents of an alkyl halide. Reaction of this thiadiazolidine with butyl bromide, for example, affords 5,5-dibutyl-2,3-diphenyl-1,1,4-trioxo - 1,2,3 - thiadiazolidine. On the other hand, the reaction of the aforementioned 5-unsubstituted thiadiazolidine with an alkylene oxide results in the instant 5-(ω-hydroxyalkyl) substances. As a specific example, 2,3-diphenyl-1,1,4-trioxo-1,2,3-thiadiazolidine is hydroxyalkylated with ethylene oxide in the presence of an alkaline catalyst such as sodium methoxide, to produce 5 - (2 - hydroxyethyl)-2,3-diphenyl-1,1,4-trioxo-1,2,3-thiadiazolidine. Conversion of the hydroxyalkyl group to the p-toluenesulfonyl ester by reaction with p-toluenesulfonyl chloride, followed by treatment with a thiophenol produces the 5-arylthioalkyl compounds of the present invention. For instance, the aforementioned 5-(2-hydroxyethyl) derivative is treated with p-toluenesulfonyl chloride, then with thiophenol to yield 2,3-diphenyl-5 - (2-phenylthioethyl)-1,1,4-trioxo-1,2,3-thiadiazolidine. Oxidation of these 5-thio compounds, preferably with perbenzoic acid, affords the 5-arylsulfinylalkyl and 5-arylsulfonylalkyl compounds of this invention. For example, treatment of the aforementioned 2,3-diphenyl-5-(2-phenylthioethyl)-1,1,4-trioxo-1,2,3-thiadiazolidine with a limited quantity of perbenzoic acid produces 2,3-diphenyl-5-(2 - phenylsulfinylethyl) - 1,1,4-trioxo-1,2,3-thiadiazolidine, while reaction with at least two molecular equivalents of perbenzoic acid results in the corresponding sulfone, namely 2,3-diphenyl-5-(2-phenylsulfonylethyl)-1,1,4-trioxo-1,2,3-thiadiazolidine.

The compounds of this invention are useful as a result of their valuable pharmacological properties. They have, for example, the ability to inhibit the local edema formation associated with inflammatory states.

The invention is described in greater detail in the examples which follow, which are presented by way of illustration and not of limitation. Quantities are expressed in parts by weight except where otherwise noted. Temperatures are expressed in degrees centigrade (° C.).

*Example 1*

To a solution of 10 parts of hydrazobenzene in 115 parts of ether is added, at 0–5° with stirring, a solution of 8 parts of α-chlorosulfonylacetyl chloride in 35 parts of ether, and stirring is continued for about 15 minutes. The resulting precipitate is collected by filtration and washed with ether. The filtrate is concentrated to dryness in vacuo and the residue washed with 5 parts of cold 70% ethanol, then crystallized from aqueous ethanol. The original precipitate is extracted with hot ethanol, and the extract cooled and filtered to afford additional crystalline material. The two crops of crystalline material are combined and recrystallized from aqueous ethanol to afford pure 2,3-diphenyl-1,1,4-trioxo-1,2,3 - thiadiazolidine, M.P. 150–152°.

*Example 2*

A solution of 63.25 parts of α-bromocaproic acid in 64 parts of water is neutralized by the addition, with cooling, of a solution of 19.25 parts of potassium hydroxide in 20 parts of water. To this solution is added a solution of 40.5 parts of sodium sulfite in 360 parts of water and the resulting solution allowed to stand at room temperature for 2 days.

A solution of 78.25 parts of barium chloride dihydrate in 360 parts of hot water is prepared and 20 parts of this solution added to the above reaction mixture in order to precipitate the unreacted sodium sulfite (determined by iodine titration). This mixture is filtered and the filtrate heated and stirred vigorously while the remainder of the barium chloride solution is added rapidly. Stirring is continued for about 10 minutes, then the mixture cooled, and the barium salt collected by filtration and washed with water to remove inorganic salts. The organic salt is dried, analyzed for barium content, then suspended in 100 parts of water and treated with the theoretical quantity of sulfuric acid. The resulting mixture is stirred for about 30 minutes, filtered, and the filtrate concentrated to produce α-sulfocaproic acid.

A mixture of 10 parts of α-sulfocaproic acid and 41 parts of thionyl chloride is heated at reflux for about 13 hours. The excess thionyl chloride is evaporated in vacuo and the residue distilled in vacuo to afford α-chlorosulfonylcaproyl chloride, B.P. 94°/2 mm.

By substituting an equivalent quantity of α-bromovaleric acid and otherwise proceeding according to the herein-described processes, α-chlorosulfonylvaleryl chloride is obtained.

*Example 3*

To a solution of 20 parts of dry pyridine in 38 parts of dry chloroform is added dropwise, at −40° with stirring, a solution of 5 parts of α-chlorosulfonylcaproyl chloride in 22.5 parts of dry chloroform. To this mixture, under nitrogen, is added, dropwise with stirring at −30° to −40°, a solution of 4 parts of hydrazobenzene in 38 parts of dry chloroform. The reaction mixture is stirred for about one and one-half hours longer, during which time it is allowed to warm up to room temperature, then allowed to stand for about 16 hours.

The reaction mixture is washed successively with dilute hydrochloric acid and water, dried over anhydrous sodium sulfate, and evaporated to dryness in vacuo. The residue is adsorbed on silica gel, eluated with benzene, and crystallized from hexane to afford pure 5-butyl-2,3-diphenyl-1,1,4-trioxo-1,2,3-thiadiazolidine, M.P. 106–107°.

The substitution of an equivalent quantity of α-chlorosulfonylvaleryl chloride in the instant process results in 5-propyl-2,3-diphenyl-1,1,4-trioxo-1,2,3-thiadiazolidine.

*Example 4*

A mixture of 1.10 parts of 2,3-diphenyl-1,1,4-trioxo-1,2,3-thiadiazolidine, 21 parts of butyl bromide, 10.52 parts of potassium carbonate and 40 parts of acetone is heated at reflux with stirring for about 20 hours, then filtered to remove inorganic salts. The filtrate is evaporated to dryness in vacuo and the residue adsorbed on silica gel. Elution of the chromatographic column with benzene affords 5,5-dibutyl-2,3-diphenyl-1,1,4-trioxo-1,2,3-thiadiazolidine, M.P. 84–85°.

By substituting an equivalent quantity of propyl bromide and otherwise proceeding according to the herein described processes, 5,5-dipropyl-2,3- diphenyl-1,1,4-trioxo-1,2,3-thiadiazolidine is obtained.

*Example 5*

A mixture of one part of 5-butyl-2,3-diphenyl-1,1,4-trioxo-1,2,3-thiadiazolidine, 8.6 parts of propyl bromide, 9.57 parts of potassium carbonate, and 40 parts of acetone is stirred and heated at reflux for about 24 hours. This reaction mixture is filtered and the filtrate concentrated to dryness in vacuo. Adsorption of the residue on a silica gel chromatographic column followed by elution with benzene produces 5-butyl-5-propyl-2,3-diphenyl-1,1,4-trioxo-1,2,3-thiadiazolidine.

*Example 6*

To 10 parts of dry pyridine is added successively 20 parts of dry chloroform and dropwise, at −30° to −40° with stirring, 1.77 parts of α-chlorosulfonylacetyl chloride in 12 parts of dry chloroform. This mixture is placed in a nitrogen atmosphere and treated, at −30° to −40°, with 2.53 parts of 4,4′-dichlorohydrazobenzene dissolved in 20 parts of dry chloroform. Stirring is continued for about 2 hours, then the reaction mixture allowed to stand at room temperature for about 16 hours. It is washed successively with dilute hydrochloric acid and water, dried over anhydrous sodium sulfate, and concentrated to dryness at reduced pressure. The residue is adsorbed on silica gel, eluted with benzene, and recrystallized from aqueous ethanol to yield 2,3 - di-(4 - chlorophenyl)-1,1,4-trioxo-1,2,3-thiadiazolidine.

*Example 7*

A mixture of 20 parts of α-sulfophenylacetic acid and 82 parts of thionyl chloride is heated at reflux for about 13 hours, then stripped of excess thionyl chloride at reduced pressure. The residue is distilled in vacuo to afford α-chlorosulfonylphenylacetyl chloride.

A solution of 10 parts of α-chlorosulfonylphenylacetyl chloride in 45 parts of dry chloroform is added dropwise with stirring, at −40°, to a solution of 40 parts of dry pyridine in 75 parts of dry chloroform. This mixture is treated, at −30° to −40°, with a solution of 8 parts of hydrazobenzene in 75 parts of dry chloroform, then stirred for about 2 hours longer. The reaction mixture is allowed to stand overnight, then "worked up" by the process described in Example 3 to afford 2,3,5-triphenyl-1,1,4-trioxo-1,2,3-thiadiazolidine.

*Example 8*

The substitution of 5.96 parts of 4,4′-dinitrohydrazobenzene, 5.30 parts of 4,4′-dimethoxyhydrazobenzene, or 6.52 parts of 4,4′-diacetoxyhydrazobenzene in the proceure of Example 3 results in 5-butyl-2,3-di-(4-nitrophenyl)-1,1,4-trioxo-1,2,3-thiadiazolidine, 5-butyl-di-(4-methoxyphenyl)-1,1,4 - trioxo - 1,2,3 - thiadiazolidine, and 5-butyl-2,3-di-(4-acetoxyphenyl)-1,1,4-trioxo - 1,2,3 - thiadiazolidine.

*Example 9*

According to the procedure described in Example 3, 5 parts of α-chlorosulfonylcaproyl chloride and 5.26 parts of 4-acetoxyhydrazobenzene are reacted, resulting in a mixture of products. This mixture is adsorbed on a silica gel chromatographic column and eluted with ethyl acetate-benzene solutions to afford the isomeric products, 2-(4-acetoxyphenyl)-5-butyl-3-phenyl-1,1,4-trioxo - 1,2,3-thiadiazolidine and 3-(4-acetoxyphenyl)-5-butyl-2-phenyl-1,1,4-trioxo-1,2,3-thiadiazolidine.

*Example 10*

To a solution of 28.8 parts of 2,3-diphenyl-1,1,4-trioxo-1,2,3-thiadiazolidine in 2400 parts of methanol is added 1.0 part of sodium methoxide and the solution is treated with 4.4 parts of ethylene oxide. The reaction mixture is allowed to stand for about 10 minutes, neutralized with acetic acid, concentrated to a small volume, treated with water, and extracted with benzene. The benzene solution is evaporated to dryness and the residue adsorbed on silica gel. Elution with ethyl acetate-benzene mixtures yields 5-(2-hydroxyethyl)-2,3-diphenyl-1,1,4-trioxo - 1,2,3 - thiadiazolidine.

*Example 11*

To a solution of 33.2 parts of 5-(2-hydroxyethyl)-2,3-diphenyl-1,1,4-trioxo-1,2,3-thiadiazolidine in 300 parts of pyridine is added, with stirring and cooling, 19 parts p-toluenesulfonyl chloride dissolved in 50 parts of pyridine. This reaction mixture is allowed to stand for about 16 hours, then diluted with water and extracted with methylene chloride. The methylene chloride extract is washed with dilute hydrochloric acid, dried over anhydrous sodium sulfate, and evaporated to dryness under reduced pressure to afford the p-toluenesulfonyl ester.

To a solution of 47 parts of this p-toluenesulfonyl ester and 11 parts of thiophenol in 480 parts of methanol is added a solution of 4 parts of sodium hydroxide in 32 parts of methanol. The resulting mixture is stirred at room temperature for about 24 hours, then filtered to remove the precipitate. The filtrate is evaporated to dryness in vacuo and the residue adsorbed on silica gel. Elution of the chromatographic column with benzene and ethyl acetate-benzene mixtures affords 5-(2-phenylthioethyl)-2,3-diphenyl-1,1,4-trioxo-1,2,3-thiadiazolidine.

*Example 12*

To a solution of 44.4 parts of 5-(2-phenylthioethyl)-2,3-diphenyl-1,1,4-trioxo-1,2,3-thiadiazolidine in 750 parts of chloroform is added with cooling, over a period of about one hour, 2250 parts of a chloroform solution containing 30.36 parts of perbenzoic acid. Completion of the reaction is determined by testing of reaction mixture samples with starch-potassium iodide paper.

The chloroform solution is then washed successively with aqueous sodium carbonate and water, dried over anhydrous sodium sulfate, and evaporated to dryness in vacuo. Adsorption of the residue on silica gel followed by elution with benzene and ethyl acetate-benzene mixtures results in 5-(2-phenylsulfonylethyl)-2,3-diphenyl-1,1,4-trioxo-1,2,3-thiadiazolidine.

*Example 13*

By the substitution of 1125 parts of a chloroform solution containing 15.18 parts of perbenzoic acid in the process of Example 11, 5-(2-phenylsulfonylethyl)-2,3-diphenyl-1,1,4-trioxo-1,2,3-thiadiazolidine is obtained.

What is claimed is:
1. A compound of the formula

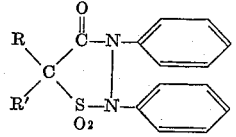

wherein R and R' are selected from the group consisting of hydrogen and lower alkyl.

2. A compound of the formula

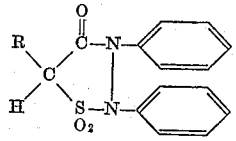

wherein R is a lower alkyl.

3. A compound of the formula

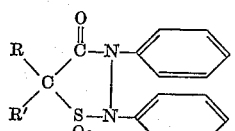

wherein R and R' are lower alkyl.

4. 2,3-diphenyl-1,1,4-trioxo-1,2,3-thiadiazolidine.
5. 5-butyl-2,3-diphenyl-1,1,4-trioxo - 1,2,3 - thiadiazolidine.
6. 5,5-dibutyl-2,3-diphenyl-1,1,4-trioxo - 1,2,3 - thiadiazolidine.

References Cited in the file of this patent

UNITED STATES PATENTS 2,895,958    Friedlander _____ July 21, 1959

OTHER REFERENCES

Van Charante Beilstein: (Handbuch, 4th ed.), vol. 4, page 24 (1922).
Elderfield: "Heterocyclic Compounds," vol. 5, page 147 (1957).